United States Patent
Szebeni et al.

(10) Patent No.: US 9,563,783 B2
(45) Date of Patent: Feb. 7, 2017

(54) METHOD AND SYSTEM FOR HANDLING OF GROUP SHARING IN A DISTRIBUTED DATA STORAGE, PARTICULARLY IN P2P ENVIRONMENT

(75) Inventors: Szilveszter Szebeni, Budaörs (HU); Levente Buttyán, Szentendre (HU); István Lám, Vác (HU)

(73) Assignee: TRESORIT KFT., Budapest (HU)

( * ) Notice: Subject to any disclaimer, the term of this patent is extended or adjusted under 35 U.S.C. 154(b) by 419 days.

(21) Appl. No.: 14/372,234

(22) PCT Filed: Mar. 22, 2012

(86) PCT No.: PCT/HU2012/000018
§ 371 (c)(1),
(2), (4) Date: Jul. 15, 2014

(87) PCT Pub. No.: WO2012/131407
PCT Pub. Date: Oct. 4, 2012

(65) Prior Publication Data
US 2015/0161409 A1 Jun. 11, 2015

(30) Foreign Application Priority Data

Mar. 25, 2011 (HU) ..................................... 1100164

(51) Int. Cl.
*H04L 29/06* (2006.01)
*G06F 21/62* (2013.01)
*H04L 29/08* (2006.01)

(52) U.S. Cl.
CPC ....... *G06F 21/6218* (2013.01); *G06F 21/6272* (2013.01); *H04L 63/0428* (2013.01); *H04L 63/061* (2013.01); *H04L 63/064* (2013.01); *H04L 63/065* (2013.01); *H04L 63/08* (2013.01); *H04L 67/104* (2013.01);
(Continued)

(58) Field of Classification Search
CPC .... H04L 63/064; H04L 63/065; H04L 9/0833; H04L 29/06551; H04L 9/0836
See application file for complete search history.

(56) References Cited

U.S. PATENT DOCUMENTS

| 6,049,878 A * | 4/2000 | Caronni ............... H04L 9/0836 380/277 |
| 6,212,635 B1 | 4/2001 | Reardon |
| 7,783,777 B1 | 8/2010 | Pabla et al. |

(Continued)

*Primary Examiner* — Esther B Henderson
(74) *Attorney, Agent, or Firm* — Birch, Stewart, Kolasch & Birch, LLP

(57) ABSTRACT

Method and system for handling group sharing in distributed data storage environment, to utilize online unexploited storage space and bandwidth of users. Files of a user are cut into pieces which are then distributed among other online users. The original files are stored retrievably. Key Lock Boxes (KLB) are used for storing keys encrypted. With an authentication and key exchange protocol a common group key is generated for encrypting a Master Key Lock Box. The Master KLB represents the root of an oriented tree graph, the nodes of the graph represent KLBs. There is an oriented edge between two nodes when a source KLB (17) contains the key of a target KLB (19). The KLBs (13, 14, 17, 19) contain keys (18, 20) to a subset of files. Starting from said Master Key Lock Box by using the common group key the KLBs (13, 14, 17, 19) are opened until the requested file is reached.

15 Claims, 4 Drawing Sheets

(52) U.S. Cl.
CPC ............... *G06F 2221/2101* (2013.01); *G06F 2221/2107* (2013.01); *G06F 2221/2137* (2013.01)

(56) References Cited

U.S. PATENT DOCUMENTS

| | | | |
|---|---|---|---|
| 2002/0076204 A1* | 6/2002 | Nakano | G11B 20/00086 386/259 |
| 2006/0075063 A1 | 4/2006 | Grosse et al. | |
| 2007/0289022 A1* | 12/2007 | Wittkotter | H04L 63/123 726/27 |
| 2010/0250497 A1* | 9/2010 | Redlich | F41H 13/00 707/661 |

* cited by examiner

METHOD AND SYSTEM FOR HANDLING OF GROUP SHARING IN A DISTRIBUTED DATA STORAGE, PARTICULARLY IN P2P ENVIRONMENT

The invention relates to a method and system for handling of group sharing in adistributed data storage, particularly P2P environment, where online unexploited storage capacity and bandwidth of users of a community connected to a network or the Internet are utilized. During the method specified files of a given user are cut into pieces, then the pieces are distributed among at least a several of other online users in such a way that the original files are stored in a manner that they can be retrieved from a limited portion of the stored data of the users performing the storage, and Key Lock Boxes are used for storing keys encrypted.

Today's personal computers have increased storage capacity as well as faster and more reliable Internet connection. However, a considerable portion of the storage space and the bandwidth remains unutilized. At the same time the possibility for online distribution of contents (e.g. online photo album) including contents edited collectively by a community is a growing demand. This may be for example collecting photos of a certain event using Picasa; collaborative work using Microsoft Groove possibly Google Docs or a version management system, e.g. SVN. If a system is sufficiently reliable then users prefer using this kind of online storage space as online backup, e.g. photographs can be kept synchronous in the local and online storage space by means of Google Picasa. However, Google Storage connected to Google Docs service may also be used as backup storage. Naturally, it is expected that data can be accessed only by users amongst which the data is distributed, i.e. authorized users.

Consequently there is a growing demand for such storage space:

1 which can be easily accessed online, i.e. through Internet connection;

2 the content of which can be distributed and this content is editable by other users;

3 distribution can be controlled and only authorized users are able to access;

4 reliable, i.e. retrieval of the stored data is guaranteed.

Although more and more service providers offer the aforementioned kind of online storage by means of redundant and safe data warehouses, it would be practical to utilize for this purpose the unused storage space available on the computers of users. The advantages of this are the following:

1 The storage space is for free since a space which is not used for anything is utilized.

2 It is a highly distributed system as opposed to a data warehouse (possibly one server), consequently failure of the computers of a few users would not affect the operation of the entire system to a large extent. On the other hand if the Internet connection of a data warehouse should stop working a significant part of the system becomes unusable for a while.

3 It is geographically distributed, thereby local problems e.g. power cut or failure in the Internet connection in a certain area would not affect the greater part of the system as opposed to a geographically concentrated data warehouse.

4 It is not necessary to rely on one service provider.

However, it has some disadvantages, since:

1 The hardware units of the computers of users are more unreliable than the units of a server, for example few desktop computers use RAID technology while it is a basic expectation in case of a server.

2 The Internet connection or power supply of the users' computers can be unreliable.

3 Practically access to these computers either physically or logically can not be restricted as opposed to a data warehouse.

4 Internet addresses of these computers are usually not fixed, e.g. in case of dynamic IP assignment by ISP or in case of a mobile client because of the different networks.

5 Typically, these computers run much less than a server which in an optimal case is never switched off.

The task is to make utilization of the temporary unexploited storage space and bandwidth of the users' computers possible by solving the above mentioned problems, thereby providing a distributable online storage space for the connected users which is reliable, controllable even in case of less reliable participants.

The aim is to create a distributed architecture which is able to behave as a reliable online storage space despite unreliable hardware and network connections. To realize this, the architecture should be able to use the unexploited storage space of users. The protocol must handle the heterogeneity and the varying requirements, e.g. supplementing and easy portability.

According to the basic idea of the present invention the users of a distributed data storage system are connected. In this network the problem of the aforementioned disadvantages 1, 2 and 5 is solved by strong redundancy while the problem of disadvantage 3 is handled by strong cryptographic methods. To solve the problem of disadvantage 4 number of solutions exist in a P2P or other distributed systems. However, because of redundancy instead of searching for a machine, searching for a content, a particular file is needed.

A further aim is to ensure the users by means of a suitable protocol the possibility to share data over the virtually created online storage space the access of which can be easily controlled: where permissions to write and read are dynamically granted for the other users. This protocol must guarantee that these permissions are granted exclusively to these users and even a privileged user is unable to have an influence on it. The aim of the protocol is distributiveness: firstly in order to be able to utilize the unexploited storage space of the users, on the other hand to ensure that the users are not required to trust in a single service provider, its administrators, hardware of its servers, etc., thirdly to ensure high fault tolerance to avoid failures in operation of the system in case of a geographically concentrated event, catastrophe (e.g. fire).

The protocol should support filtering of malicious users who use much more resources than other users are provided with.

However the protocol advantageously should guarantee a chance to access the files, in order to meet greater requirements—for example faster download of files or faster access to available file pieces, etc.—it should also support joining of servers of professional service providers. Even a service provider should be handled as an unreliable node, but more reliable than a user node. The possibility to get engaged in operating other parts of the protocol in addition to access to files must be ensured (e.g. authentication).

By realizing decentralized data storage at storage level, high data security can be provided for users. Also it is important for the protocol to be able to operate without initiating a particular service provider either through the Internet or a local network environment.

In the followings the essential points, features of the invention are illustrated through an example.

An individual user (hereinafter called Alice) is working on an international project and her colleagues are from different companies, from different countries. Alice would like to share the files with some colleagues who may modify them. The problem is that there is no possibility for a server which can store the files reliably (e.g. there is no RAID or backup, etc.). To this end Alice cuts the 'gathering.xlsx' file to be stored into pieces and distributes the pieces over machines being online on the Internet in a redundant manner. Then Alice informs her colleagues about the accessibility of the file(s). In this manner they can download the files and may modify them, then upload the modified pieces. There are several problems:

How to cut Alice's file into pieces?

How high redundancy is needed to distribute Alice's files so that at least one instance of each of the pieces be almost always online.

How can one find the pieces?

How should concurrent write operations be handled?

These problems lead to a still researched subject, the science of distributed data storage. With the present invention we do not intend to introduce a new distributed storage, preferably we lean on existing solutions. Hereinafter these systems will be referred to as low level file systems or (if it is not mistakable) simply file systems. At this level it is expected that on providing a key (e.g. file name) a contiguous byte array (file) returns. Further problems:

If Alice encrypts the files so that only her colleagues can read them, how can she send the keys to them?

How can we guarantee the integrity of the files, that is, how will Alice know that the modifications were made by her colleagues indeed, and not by others?

If Alice has a new colleague, how can he join the group? Or, if an old one leaves how is he prevented from accessing the files?

These problems must be solved in a higher level layer. In terms of practicability integrity check should be performed at the time when the files are stored, e.g. when in a peer-to-peer (P2P) system one of the peers replicates the file to another peer. If the check is performed only when the file is to be used, though the unauthorized modification can be detected, but all the other peers who merely stored the file, stored the wrong data.

A high level file system must handle validation of authentication, that is, the already authenticated user must decode the file by using the right key or in case of modification the modified content must be provided with the appropriate integrity protective code.

It is not enough to be able to refer to an object by using a unique identifier, we would like to access the files organized in directory hierarchy so that a unique name can be given to them. A special module, a file level rating unit must ensure that the high level identifier (access path, file name) can be modified.

The requirements in a large distributed network may vary: some people want maximum security and some people are satisfied with lower security but higher speed. This is why the present invention uses an architecture that can be supplemented, the base modules of which can be exchanged.

Identification, authentication of users is essential, to this an additional module is required. The task of this module is to generate a common secret which is known by each of the authorized users but none of the unauthorized ones. This common secret can be used for decoding the keys of the files for reading or the keys by means of which the modified file can be signed.

On the one hand data must be encrypted in order to prevent unauthorized persons from reading the contents of files with confidential information. Considering that there may be a great amount of data (e.g. a database dump) the use of asymmetric encryption must be minimized as it requires many calculations. Therefore symmetric, effective cryptographic methods based on block encryption should be used.

On the other hand integrity of data must be ensured since storages are untrusted, anybody can access their content. Integrity can be ensured by using symmetric (e.g. HMAC) or asymmetric (e.g. digital signature) methods. In case of symmetric method the integrity of a given file can be checked only by a person who owns the key with which the integrity protecting code was generated. In case of the asymmetric method the key needed for the check (public key) is separated from the key needed for generating the integrity protecting code (private key). As it would be useful to check the storage whether the just uploaded data is modified by an authorized user asymmetric integrity protecting method must be used.

It is an important problem that in a distributed, open system malicious users can appear who would like to use much more resources than other users are provided with and they are not willing to pay for professional providers. These malicious users must be filtered and 'penalized': in case of excessive use only a minimum of resources or nothing at all should be ensured for them.

It can be assumed that professional service providers would like their services to be used (e.g. storing of files) only by their clients. Considering that the provider and the client are not necessarily in a point-to-point connection, providers e.g. must collect data about their paying clients and store them in a peer-to-peer system, too. In order to prevent other people from using the resources identification of the clients' data must be made possible.

The present invention is a protocol based on modular architecture. In this approach the aforementioned problems are solved in separate modules.

The invention is a method according to the preamble for handling of group sharing in a distributed data storage environment wherein authentication and key exchange protocols are used jointly for generating a common group key with which a highlighted Key Lock Box is encrypted as Master Key Lock Box. The Master Key Lock Box represents the root of an oriented tree graph, the nodes of the graph are further Key Lock Boxes, and there is an oriented edge between two nodes if a source Key Lock Box contains the key of a target Key Lock Box, and in a particular case the Key Lock Boxes may have keys to a subset of the files. During the method starting from the Master Key Lock Box by using the common group key the Key Lock Boxes are opened one after the other downwards in the tree until the key of the requested file is reached.

Features of the invention will now be described with reference to the accompanying drawing in which.

Figure 1:
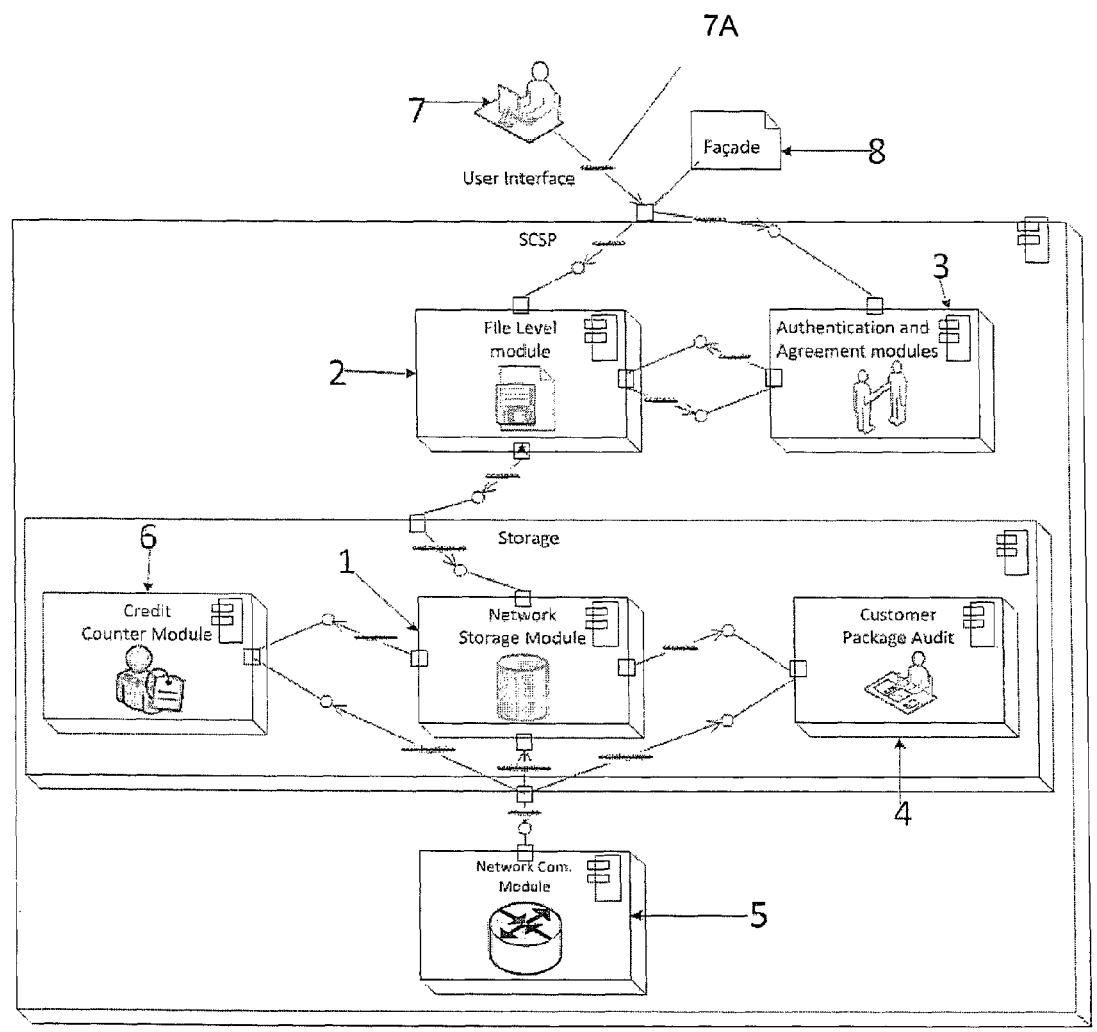
FIG. 1 shows the levels of the architecture according to the invention.

In the embodiment according to FIG. 1 Network Storage Module 1 is built on OceanStore which provides the services of a P2P low level file system. Network Com. Module 5 is built on an authenticated key exchange protocol or a key exchange protocol operating over an authenticated channel, in this manner not all of the old group members 7 are needed to be online at the same time when a new member joins or leaves the group.

File Level Module 2 guarantees read permission using the so called AES256-CBC encryption while write permission is guaranteed by digital signature, RSA. Encryption and signature both represent separate sub-modules, they can be replaced, substituted by another. Keys of the individual files are generated by File Level Module 2 through scaling, using a so called hierarchical Key Lock Box architecture, thus when the key of a file is changed the master key is not needed to be changed.

Distributed or peer-to-peer file systems are active topics of research, their development is in progress, it can not be told unambiguously which solution is the best. It is important to note that for the present invention we did not search for file systems but for distributed solutions which make some kind of persistent data store possible which can be used as a file system through abstraction.

According to the present invention the authorized unit of the system is the group: on the one hand it is a set of users who have the permission for the same resources. It may be a one-person group. On the other hand the group includes the files which are accessible for the aforementioned users. One file can belong to only one group, however, read or write permission to a file can be given within a group. However, this restriction does not exclude establishing number of group distributions which is customary in centralized distribution. To this the directory to be distributed is assigned to a common group the members of which are the group creators. Files of a group are arranged in a customary directory hierarchy i.e. in a rooted tree in which links can be established for access. The root is the root directory of the group distribution. In this manner the group can be considered as a high level file system, together with authorities.

Now the architecture will be described in a top-down, i.e. from higher level to lower level approach. We do not take user interface 7A as a starting point since it is not considered as part of the invention. The system according to the present invention is a layered architecture as it is shown in FIG. 1, however, these are not strictly considered as layers. Layer organization simply follows the abstraction levels of modules.

The architecture is provided with a facade 8 which can execute high level operations as "Create new group", "Join to a group", "Open a file", "Write a file" "List the content of a directory" etc.

Facade 8 directly uses File Level Module 2 and Authentication and Agreement Module (AAM) 3: at the beginning it is required to give the ID of the group whose files are to be accessed by user 7 and the authentication data to the group. More particularly: The group identifier must be given to File Level Module 2, then meta data describing the group is downloaded (Group Info): what sort of Authentication and Agreement Module 3 should be used, where can the root directory be found, etc. Authentication data e.g. a password or an RSA private key must be given to Authentication and Agreement Module 3 through facade 8. If the authentication is valid Authentication and Agreement Module 3 returns one or two keys, the Read Master Secret and/or the Write Master Secret. With these Master Secrets the File Level Module 2 can decrypt the respective keys belonging to the files. Then the root directory and all other files of the group can be opened through File Level Module 2. Then the File Level Module 2 provides an interface of hierarchical, high level file system. File Level Module 2 stores encryption or signature keys protected by the Master Secret.

Furthermore, the Authentication and Agreement Module 3 is used for handling group changes: leaving and joining the group, creating a new group. Additionally, Authentication and Agreement Module 3 may provide services to File Level Module 2 which can be accessed by the user, through which a directory or file can be shared with other groups without admitting the users one by one to the already existing group.

In the middle layer there is a storage divided into three sub-modules, the most important of which is the Network Storage Module 1 as a low level file system. This module assigns a dataset (a low level file) to an ID. This module does not organize the files in hierarchy, this is to be done by File Level Module 2.

Network Storage Module 1 handles storage, searching and reading of low level files. This module also stores the file pieces of others, and manages downloads of others. Furthermore, this module manages integrity of low level files: each of the low level files are signed at the time when it is first stored and the signature public key is given to each of the storage peers together with the file pieces. In this manner modified data of only one authorized user is stored at the storage peers since permission for modification can be checked at these nodes, too (storage peer is a peer that stores the file, not necessarily a member of the sharing group, but joined to the distributed data store system).

The lower level is the Network Communication Module 5. On the one hand this module supports the usual TCP/IP, IP, UDP/IP protocols, on the other hand a P2P communication protocol. In general, Network Storage Module 1 of the medium layer can be joined with Network Communication Module 5 of the lower level, or it is feasible that P2P communication module is a part of the Network Storage Module 1, while the usual protocols belong to the lower level.

Credit Counter Module 6 helps Network Storage Module 1, controls resource allocation. The policy is to give preference to only the benevolent community users during allocation of resources. The ones who provide the community with more resources (storage space and availability) will receive more resources from others in return. Therefore it is not worth "exploiting" the community because the members may freeze out a user. Credit Counter Module 6 deals with qualification of individual users in a distributed manner. It is supposed that at Credit Counter Module 6 there are more benevolent users than malicious ones.

Customer Package Audit unit 4 is mainly for professional service providers: it is used for filtering the packages of the subscribed users out. In this manner a provider that joins the community would not provide any or only a small amount of resources for the members who do not pay. Thereby the machine of the provider would be considered as not benevolent peer by a subset of peers, but it does not present a problem since the provider collects and stores the clients' data and does not want to use the resources of the community e.g. for storing private data.

The architecture defines a higher level "file system" over a network file system, in which safe teamwork is supported. This module is the central module of the system according to the invention, basically it coordinates the whole structure. Therefore it will be described in more detail.

A root and authorizations, keys and all of the users belonging to it represent the group. Any operations associated with the group must start from the Group Info object. The user must "find" this object first. However, finding this object is not trivial, it is supposed that the user has a group ID. This object describes the authentication and key exchange protocol to be used for joining the group. After successful authentication two of the Authentication and Agreement Modules 3 returns two different keys to the user.

Hereinafter one of the master secrets is referred to as Read Master Key the other is referred to as Write Master Key. Each of the group members must have read permission, but it is sufficient if only a subset of members have write permission. In case of some special system files each of the group members must have write permission, this is solved by originating the write key to these files from the Read Master Key.

Figure 2:
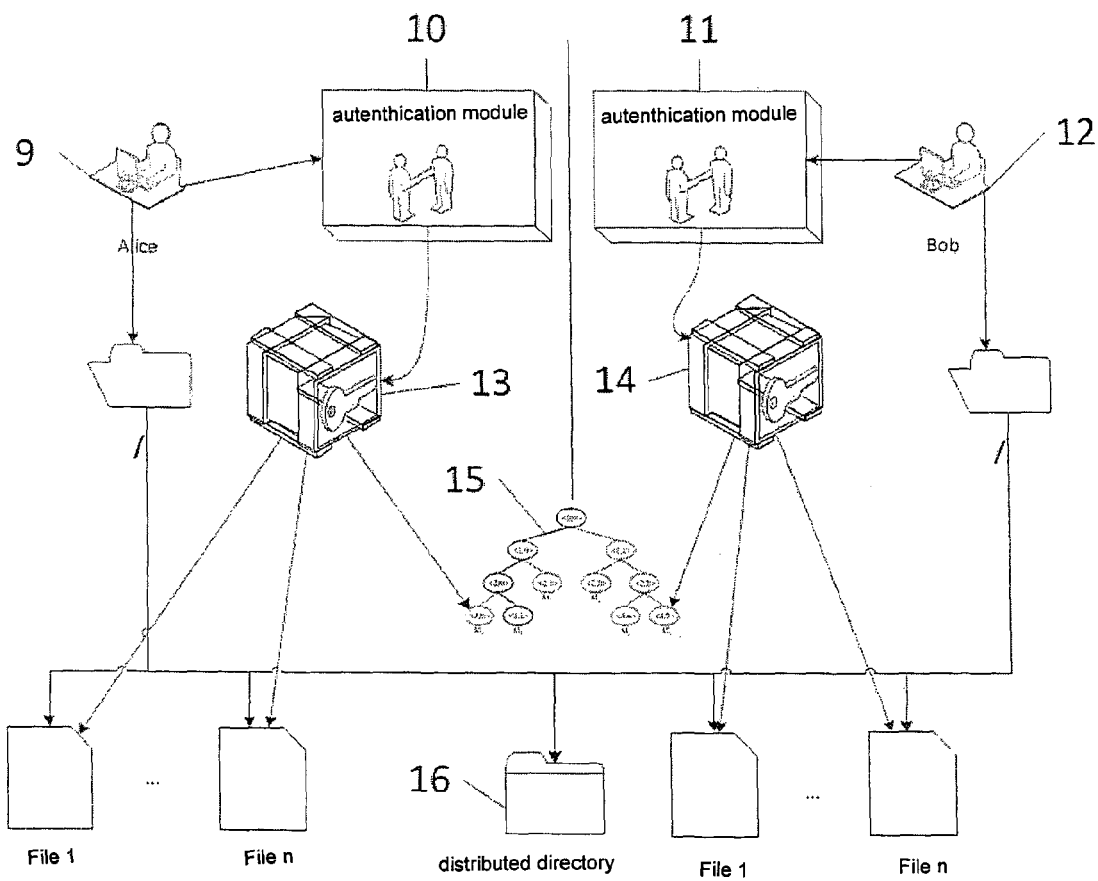
FIG. 2 is an operational chart showing authentication modules and KLB (Key Lock Box) modules.

In FIG. 2 it is shown how a reliable file access and write permission can be given to group members 9 and 12 (e.g. Alice and Bob) by means of authentication modules 10 and 11. Through a TGDH-type key derivation tree 15 Master Secrets to a shared directory 16 are derived from keys in KLB 13, 14. Other key exchange protocols different from TGDH may also be used.

Handling of the actually used keys are performed by means of Key Lock Boxes (KLB) 13, 14. They contain the encrypted keys. A similar solution can be found in publication titled Group Sharing and Random Access in Cryptographic Storage File systems by Fu, Kevin E (MIT, 1999, Master's thesis). The solution according to this publication does not use hierarchical KLB system and key exchange protocols. It uses a centralized system, not a low level distributed architecture. Among others the aim of the present invention is to eliminate the unfavourable effects of these deficiencies.

There is a highlighted Master Key Lock Box which is opened by the so called Master Secret (this is true for both Read and Write Key Lock Boxes and Master Secret). Key Lock Boxes 13, 14 store encrypted keys with which the individual files (directories) are encrypted/signed. The reason for using Key Lock Boxes 13, 14 instead of using the group key for each file is that:

a) After every change in the group the group key is also changed. In case of group key change there is no need to re-encrypt the whole file system.

b) Implementing lazy re-encryption is easy.

c) Sharing among groups can be performed in such a way that the common key of a file is derived from the two keys of the two groups respectively.

Group Info among others contains a pointer to the root directory. Starting from this root directory every file and directory belonging to the group can be accessed like in Unix file systems. Furthermore, similar to Unix file systems every file: the directory and the Key Lock Box are (special) files. At low level the architecture is based on iNodes connected to the data storage part of the file. This iNode is similar to the iNodes used in Unix systems, it describes meta data of files. It has an important role during encryption since this file contains data needed for finding the so called Key Lock Box.

The main difference between UNIX and the present invention is that in UNIX systems the iNodes are used over a block organized storage, while our system operates over a file organized storage. As it will be seen, by performing small changes it can also be used over a block organized storage, but it is unnecessary, as most of the distributed, network storage solutions offer object organization of some type (not necessarily file system).

In order to illustrate the operation the following conventions are introduced:

High Level File (HLF): a file defined by the invention
Low Level File (LLF): a coherent object on a storage solution, the size of which may vary and can be referred by an ID, which is not necessarily hierarchically organized.

A file can belong to only one group, however it may be mounted to other groups, too. In this case only a link is established to the file, no other data about the file will be stored at the other group (cross-group link).

The architecture according to the invention is based on a network (possibly distributed) storage. It is supposed that it can store our objects in an organized manner, that is, a variable sized, coherent series of bytes that can be accessed by an ID. A storage of this kind is supposed at the lower level. Hereinafter this level will be referred to as Low Level. A lower level object will be referred to as Low Level File, its ID will be referred to as GUID.

Several low level file systems may be used at the same time, therefore besides GUID the type of the medium always must be given.

Defining of iNodes takes place at inner medium level of File Level Module 2. The iNode stores meta data of a file and a pointer to the raw data. Considering that in certain systems a the may not exceed a determined size, large files are stored in several low level file which are connected by the iNode. In this manner the upper layers become independent from the restrictions of the low level.

Consequently the iNode may refer to several file parts or another iNode. The latter case is called indirect reference.

It can be seen that in a special case it is feasible that the iNode points to fixed sized blocks, then a system similar to UNIX iNode is obtained, and block organized low level storages can be used.

A lot of metadata can be defined for a file.

A high level file is made up of an iNode and the file parts. This file is accessed by the users, in fact this is a high level interface to the file system. The iNode or file parts can not be accessed by the user directly.

The user can access 3 types of files:
Normal file for storage of data
Directory
Link The link is a higher layer equivalent to iNode with some restrictions. With a link the user can generate a cross-group link or in-group link. In the background the iNode of a link points to another iNode, thus the link is the only high level file.

The iNode of its medium level equivalent does not contain file parts. Naturally, at the end of the link there are file parts as indirect reference. An important restriction is that the link can not be modified, and only existing file (maybe link) can be referred to when it is generated. In this manner circles are avoided.

The directory operates in the usual way: a directory may contain an optional file. In order to map it to the medium level the file parts store a list about the GUID of the iNodes of the files contained in it.

A normal file is a file in which the content of the file parts can be accessed directly by the user. Reasonably, the content of special files is protected from the users by the system. In these files optional data can be stored either in binary or text form.

The method according to the invention defines three special high level files which are not directly accessible for users:

Key Lock Box
Group Info
System File

Key Lock Boxes are very important for encryption and for ensuring integrity: the Key Lock Boxes store the keys of individual files. In this manner every file comes with a Key Lock Box except for Master (Read and Write) Key Lock Boxes the special feature of which is that it can be opened with the Master Secret and it stores the key of the root directory.

There can be only one Group Info in a group. This is a special file that describes the operation of the whole group. This file may have a lot of additional information, some of them are essential for proper operation:

The way to get read/write permission, the used authentication protocols and their information
 GUID of the root directory
 GUID of Master Key Lock Boxes In addition it can have a lot of other information, therefore it is defined in XML format. Higher effectiveness can be achieved with a file of ordered inner format. This is introduced experimentally, considering that handling of data in a memory is order of magnitudes faster than accessing files in a distributed storage system, in this manner bottleneck is avoided. With this approach modularity, supplementing can be ensured.

Advantageously the keys used during encryption are stored in Key Lock Boxes. Originally the same key is used for each of the elements of a directory, however, this may change because of lazy re-encryption which will be described in more detail later. Finally in this manner in a Key Lock Box a key can belong to:

One file
 Several files
 An identification interval
 Every file in a directory

Figure 3:
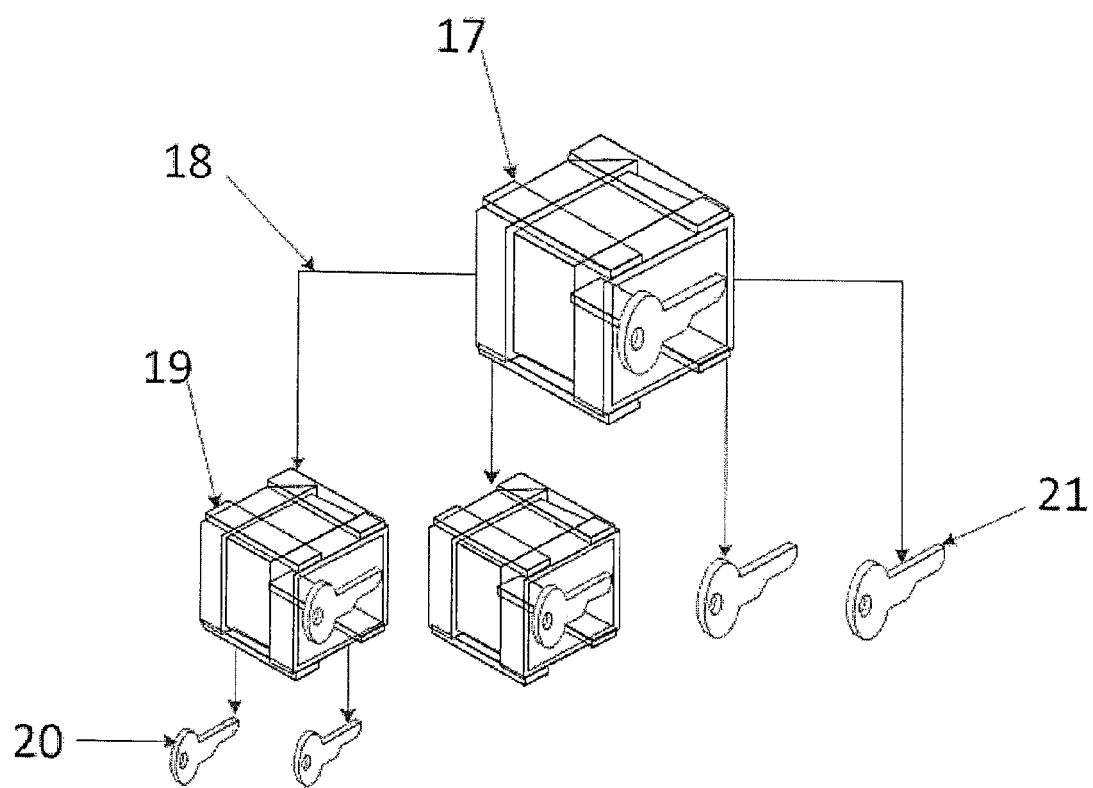
FIG. 3 illustrates the cryptographic scheme of a Master Key Lock Box.

However, in case of many files the size of the Key Lock Box belonging to the directory may be increased to a large extent which makes handling inefficient. Therefore, in the present invention a hierarchical Key Lock Box 13, 14 structure is used by means of which Key Lock Boxes 13, 14 can be divided to several smaller Key Lock Boxes as required, in order to ensure faster access in the interest of efficiency. This hierarchy is formed similar to B-trees, and it also can be solved that keys of the files used more often be present at higher level. But hierarchy may also be developed in other manner: the individual Key Lock Boxes 13, 14 can be connected to the directories of the file system. In FIG. 3 Master Key Lock Box is encrypted by Master Key returned by Authentication and Agreement Module 3 as it was earlier described with reference to FIG. 1. In this hierarchy there is a Key Lock Box 19 belonging to Master Key Lock Box 17 if master Key Lock Box contains key 18 to Key Lock Box 19. The hierarchy of Key Lock Boxes 17, 19 can be carried on recursively. Furthermore, each of the Key Lock Boxes 17, 19 have keys 20, 21 for certain files.

Let's suppose that somebody leaves the group of Alice as it was mentioned earlier. In this case the Master Secrets, the keys of the files must be changed and every file must be re-encrypted. This is inefficient, since many of the files would never be changed, only when they are re-encrypted. In a distributed untrusted environment this is much more problematic since after re-encryption all the pieces of the file must be replaced at every peer.

Therefore re-encryption and replacing of online pieces must be avoided in any case because completion of it is practically impossible. A good solution is if a file is re-encrypted only when it is modified, in this manner the number of unnecessary file changes are minimized. This solution does not risk security: it can be supposed that an adversary user has a backup of all the encrypted files. If the file is re-encrypted, this adversary user can read its content as he is aware of the old key.

In the present invention it is implemented in the following way: if e.g. a key 20 is compromised than key 20 is marked with a "dirty" flag in its Key Lock Box 19. If key 20 belongs to a directory or Key Lock Box 19, the dirty flag is recursively applied to every key stored below it in the hierarchy. In this manner through a dirty mark all the keys standing below the Key Lock Box can be disabled, in an extreme case by marking the keys of the Master Key Lock Box with a dirty flag the keys of all files indirectly become dirty. In case of modification the node which would like to write the file must check whether the used key is dirty. If not, the node can use the file as it was described in the foregoing. If it is dirty, a new key must be generated, stored in the KLB then the whole but already modified file must be stored with the new key.

With respect to write permission much can be lost if the keys of the files are not replaced: if a write key is compromised, an adversary user (this can be an angry, excluded group member) may replace the content of the files by a random number or simply delete them on all peers. Secrecy is not affected but reliability is. However, this is a significant problem, none of the peer-to-peer systems make efforts to solve it. In the systems under survey the only step taken is that after write permission revocation the write key is replaced one by one for all files. This does not mean that all the files are re-encrypted, so key replacement is much faster, but it is a big task. A race against the adversary user may start: who is faster in replacing the write keys. This quasi equals to lazy algorithm in which the key of the file is replaced only when it would otherwise be modified, since it can be supposed that the adversary user is much faster and is in a more advantageous situation. It is feasible since a user with write permission may behave adversely and delete all files. Thus write permission should only be given to trusted users.

If ensuring strong integrity for the files of the group is required a difficult problem may be who is to decide the members that can have write permission. What if exactly the user with permission is excluded from the group and the other members are the adversary users. Well, this is an extreme example, in fact generally the majority of the members have the permission. Therefore the majority of the group may decide to whom the permission is given. But how can the storage peers be informed about the decision? Let us take the following example: for managing the affairs of an apartment building in certain offices (storage peers) a person must have an authorization from the majority of owners. Offices can only check who the owners are. The owners are not able to inform all the offices if there is a change or it takes a lot of time. On the other hand a minority of the owners can not give valid authorization. How can somebody (e.g. a representative) manage the affairs in the name of the owners?

a) In a first approach the representative gets the authorization from the majority of the owners. The problem is withdrawal. A solution can be that the authorization is valid only for a certain period of time (e.g. a day). Offices can check the expiry of the authorization (within a certain margin of error). It is a good heuristic, however, withdrawal of authorization can not be surely guaranteed.

b) In an other approach the majority of the owners go to the office together with the representative and provide evidence of authorization of the representative on the spot, or he is authorized to perform only a particular transaction. This is safe, since authorization can be withdrawn immediately, but it means a large overhead.

c) A representative gets a single-use authorization, that is, the certificate of authorization must be handed in and he can not use it again in the same office. However, the representative can copy the certificate (not in the real life, but as it will be seen later, he can do it in an information system), and he can use it in other offices for managing other affairs until a notice is sent to these offices. This may cause inconsistency, furthermore the representative may collect the owners' authorizations and use them at the same time.

In an advantageous embodiment of the invention monitoring distributed storage capacity by a data handling community in a controllable manner becomes possible.

KLBs, e.g. Key Lock Box 17 or 19 may also be modelled as an associative array which provides an encryption key for a file ID.

Referring to FIG. 2 a generalizable example is shown for handling keys in distributed manner in a KLB structure. The advantage of this is that different files can be encrypted with different keys since encrypting every file with the same key is not practical. On the other hand, due to the KLB structure, re-encryption of the file system is highly effective: instead of re-encrypting every file, only the change is re-encrypted. However, in order to ensure Forward secrecy i.e. to make it sure that re-encryption will provide future protection, some KLBs must be exchanged upstream in the tree hierarchy towards the root. To this the possibility of using several keys in the file system must be managed. The basic principle itself is well known: the so called lazy re-encryption in which re-encryption is delayed till the time of the first modification, but it has not been realized in a hierarchic system yet. The hierarchic KLB structure according to the invention can be used for this purpose, too. FIG. 2 shows how to derive key words. First Alice is informed through Group Info object which Authentication and Agreement Module (AAM) 3 and what parameters she should use, then sends her own key to the Authentication and Agreement Module 3. After valid authentication the Authentication and Agreement Module 3 returns the proper Master Secret. In case of unauthorized access it is guaranteed mathematically that Alice's Authentication and Agreement Module 3, 10 will return an incorrect Master Secret, otherwise security can not be guaranteed. The program part implementing Authentication and Agreement Module 10 must be executed by Alice. Using the Master Secret, Master Key Lock Box 13 can be opened in which among others an encrypted key is contained to the KLB of the root directory, which contains the encrypted keys to the root directory and the files stored in it. In addition it also contains a special key to a merged group: In the same manner as Alice could calculate the group key from her own key through her Authentication and Agreement Module 3, any other member of her group can calculate the Group AuB group key by means of the special key contained in the root directory and through an Authentication and Agreement Module 3 even if the keys, of other members are changed, in this example it is guaranteed by the merged group key exchange protocol and the TGDH-type key derivation tree 15 implementing Authentication and Agreement Module 3. The same is true for the group of Bob. On the other hand, if Alice opens e.g. a shared directory 16, the keys of the files present in this directory can be found in the KLB belonging to distributed directory 16 in the same manner as the keys of the files present in the root directory. That is, Alice must open the KLB of shared directory 16 to which she has already calculated the key, then she must decode it and the requested files in shared directory 16 by using this key.

Files may belong to other groups not only a single one. Sharing between groups can be set in a Windows File Sharing so that members of another group may access certain information. The two groups may change independently of each other, and conveniently, when a member is excluded only from the second group, file sharing is not any more permitted for him and modification of authorization for all resources one by one is not needed for all users. This is ensured by the group merging according to the present invention—this function is provided by means of the KLB structure and key agreement protocol. It operates as follows: a group is created on the basis of key exchange among the users. A group of groups may also be created in such a way that a "representative" (anybody from the group) agrees with the representative of other groups to create a merged group by generating keys, etc. Then the representative stores the content of the agreement in the KLB of his own group. In this manner authentication can be revoked from one of the groups in the same way as from a user in that group. On the other hand, according to the present invention if the group is changed, the parts of the file system must be re-encrypted with new keys. If the group's shared directory were also re-encrypted a member would not be able to access its content since keys can be calculated only within a group. With this method it can be ensured that when a member uses a new key to the shared directory, the members of the other group can calculate this key—this is guaranteed by the key exchange protocol.

An example: Alice's client reads the required data from Group Info object. Authentication and Agreement Module (AAM) 10 returns the Read Master Key. Alice follows the pointer in the Group Info to find the encrypted root directory. The iNode of the root directory has a pointer to the Master Key Lock Box, but Group Info also has this information. Master key Lock Box (MKLB) has a key to the root directory, thus Read MKLB which is opened with Read Master Secret must be read. After decrypting the root directory the KLB belonging to the directory is opened with the key of the directory and can be read. This KLB stores the keys to the files of the given directory and the list contained in it can be read on opening of the directory. When Alice opens a directory in the root directory the procedure must be continued recursively: she decrypts the client directory with the key in the KLB, opens the KLB belonging to the directory, etc.

Implementing of Authentication and Agreement Module 3 is based on TGDH (Tree-based Group Diffie-Hellman) protocol. However, this is not completely satisfactory for using as AAM. For authentication a supplement of it is used: S-TGDH or RSA based authentication. In the embodiment of the present invention broadcast messages are not stored as network messages, they are stored as a special file in a high level file defined by the invention. In this manner it is guaranteed that group members who were not online when the broadcast message was sent, are also informed about the message. This is referred to as Persistent TGDH supplementation. Another TGDH modification is for handling group change: there is always an appointed person (sponsor) who effectively introduces a new member or makes somebody to leave. The protocol does not care if this person is not online when somebody would like to join. In our supplementation in this case a new person is appointed temporarily. Because of mathematic features of the TGDH protocol effectiveness is guaranteed only if joining/leaving of a member is always effected by the originally appointed person. In our supplementation the best sponsor candidate currently available is selected. In order to determine the "goodness" of a sponsor candidate it must be examined to what extent would the optimal height of the TGDH tree be decreased if the given sponsor performed the group operation. Based on the actual position of a candidate in the tree goodness can clearly be defined. Simulations show that in practice guaranteed effectiveness is hardly weakened with this ordered heuristics.

A further optional CCM module may be used for supporting proper resource allocation. This ensures that the system according to the invention operates as a community: everybody must participate in the operation; the ones who try to exploit the community must be excluded. For operation three main factors (resource) are needed:

a) storage space
b) bandwidth
c) availability

The person who provides approximately the same amount of resources for others as the amount used by him is called gallant. Resources, though weighted differently, are included in the so called "gallant factor". Thus, if somebody has a lot of storage space but small Internet bandwidth, still can be gallant: certain capabilities and features may complement each other similarly to a human community. The ones who are not gallant must be penalized somehow. The only penalty in this community can be revocation of resources. Consequently, the task is to determine the gallant factor of the individual peers. We can have confidence of the gallant factor of the peers if we get into contact with them. However, filtering the non-gallant peers is much slower in this way. Therefore, similarly to a human community, gallantness of an unknown peer may be predicted through "gossips". That is, peers tell each other what they think about others and rumour of a non-gallant peer is spread quickly in the network, and resources of the non-gallant peer may be revoked by the other peers. In this manner a non-gallant peer can be expelled. However, just like in human communities, we can not trust in these gossips. The reliability of information depends on the reliability of the source. So an additional value, reliability of peers should be taken into consideration. This value can only be determined heuristically: to what extent the information received from the given peer proved to be true.

Figure 4:
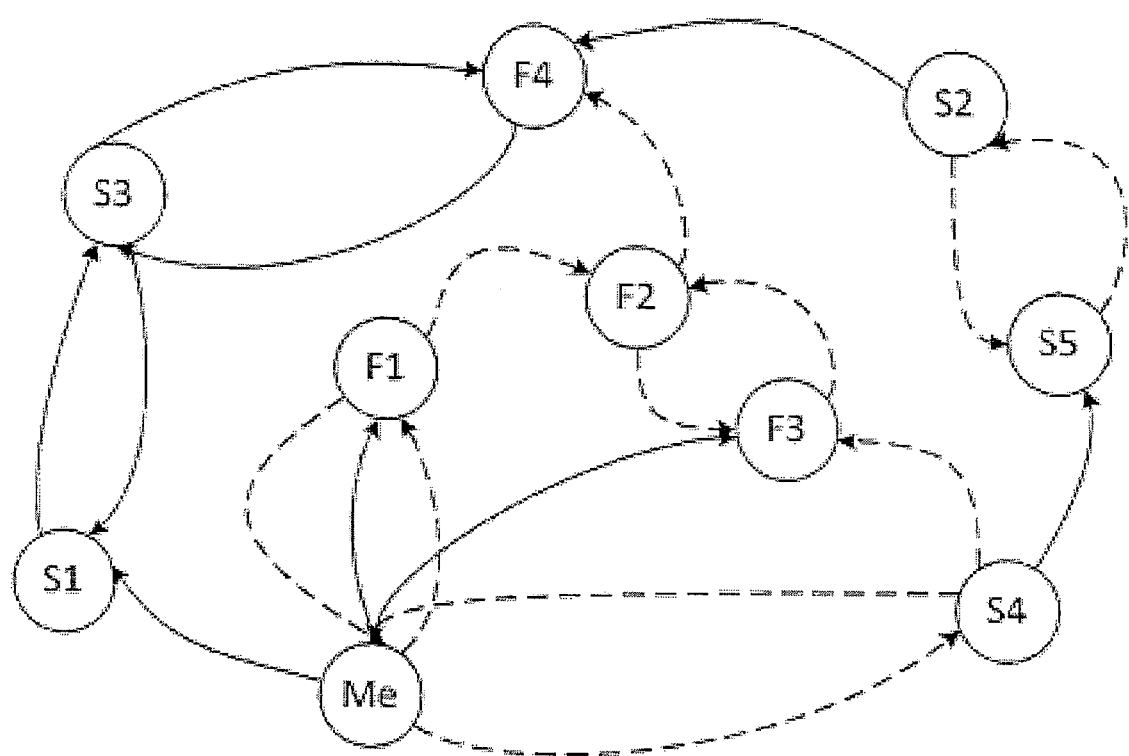
FIG. 4 is a graph showing the operation of an optional CCM module.

An important question is the initial value: what value is to be assigned to an unknown peer? The principle is that with regard to resources we are obliging, it means, that a medium high gallant factor is assigned to an unknown peer and this is corrected later based on experiences and "gossips". Regarding reliability we must be careful: a medium low reliability is assigned to every unknown peer. According to the invention the users are organized in trusted groups: the term friend is introduced. Friends are members who belong to at least one common group. We trust in friends and behave more gallant with them in real life, so initial values are given similarly in CCM module. Naturally, the values of friends may change, they may cause disappointment, so value of one or the other factor may be decreased as compared to its initial value. In FIG. 4 a graph of reliability and gallantness is shown as an example which can be considered as a formal model of the foregoing. Thus in FIG. 4 a weighted oriented graph can be seen. Starting from the personal point Me nodes S1-S4 and F1-F4 are peers, the weight of the edges are determined according to what the given peer thinks about the other peer. In this manner there can be maximum four edges between two points: what peer A thinks of the reliability of peer B, what peer A thinks of gallantness of peer B and vice versa. In the Figure an example is shown: what a peer thinks of the reliability of another peer is shown in dotted lines while the degree of gallantness is shown in a continuous line. It is important that values of the individual edges are not static, and the peers in addition to sending their own edges can send information about how they see the whole graph.

In addition to gossips, determination of the factor of gallantness is also based on measurements. Availability, bandwidth and the storage space provided by the user we are in contact with are measured. Methods for measuring the first two are known. But how can we be certain that our neighbour has actually stored a given file? In the CCM module of the present invention it is executed as follows: before storing the file a few permutations of random length and combination (e.g.: 32,43,12,45,1; 45,22,32,121) are selected from the sequence numbers of the blocks of the file. Then by selecting a permutation the blocks with the given sequence numbers are taken in the order according to the permutation, then a fingerprint is made from the so created partial file by means of a cryptographic hash function (e.g.: SHA-1). The result and the original permutation is stored, then the process is repeated for the other permutations, too. In possession of the file the hash value can be determined quickly and easily. After storing the file on the machine of another user, it can be deleted from our own machine, however, the stored permutation-hash pairs are not deleted. In order to be certain that our neighbour has really stored the file the permutation is sent to him as a question the correct answer to which is the hash value determined (and kept in secret) by us. If he stored the file he can answer the question quickly and easily, otherwise he can not give the correct value, he can only guess. If a user has not stored the file, the chance for returning the correct answer is only slight ($2^{-256}$). Consequently, in case of a correct answer we can be sure that the file has been stored by the user—and as the size of the file is known, the size of the storage space provided by him is determined.

To sum it up, the task of the CCM module is to maintain the above described graph on the basis of the measured and received information, determine the values of the factors (reliability, gallantness) of the peers based on this information, then feed back this information and allocate the required resources to the peers.

With the solution of the present invention through advantageous resource allocation distributed permission handling can be performed in distributed storage systems.

The invention claimed is:

1. A method for handling group sharing in a distributed data storage environment, wherein specified files, directories and Key Lock Boxes of a given user or a given device of group member devices are stored in a manner that the specified files can be retrieved from the distributed data storage system, the method comprising:

storing a set of keys in said Key Lock Boxes, wherein said Key Lock Boxes contains the set of keys to a subset of files, directories or said Key Lock Boxes;

generating, by only the group member devices, a common group key by using a key exchange protocol between said group member devices;

assigning one specific Key Lock Box (KLB) among said Key Lock Boxes as a Master Key Lock Box (MKLB), wherein the MKLB represents the root of an oriented tree graph, each KLB among said Key Lock Boxes is a node in the oriented tree graph, each KLB, other than the MKLB, has a parent KLB that
is represented as the node in the tree graph that is one
step towards the direction of the root node;
encrypting said Key Lock Boxes with unique keys;
storing the unique keys of each file, directory, or KLB in
its parent KLB;
encrypting, by a group member device of said group
member devices, said MKLB with the generated common group key;
decrypting said MKLB by using the generated common
group key to obtain a first set of keys, wherein
the first set of keys in a first KLB among said Key Lock
Boxes includes at least a key unique to a second KLB
among said Key Lock Boxes which is a direct child
of the first KLB;
decrypting, downwards in the oriented tree graph, a KLB
among said Key Lock Boxes by using said unique key
of said first set of keys to obtain the second set of keys,
wherein the first set of keys are different than the
second set of keys;
decrypting, downwards in the oriented tree graph, until a
key of a requested file or directory is obtained; and
decrypting file or directory with said obtained key,
wherein
a common group key version is represented by a value
of N, N is a value greater or equal to 1 and the value
of N starts with a value of 1,
each time the common group key version is changed,
the value of N is increased by a value of 1,
each key has its own key version which is represented
by a value of F,
each time a new key is generated and inserted in a KLB,
the value of F for that particular key is set to the
current value of N,
in response to a change of a file, directory, or KLB, a
re-encryption process is performed only if the value
of F for the key associated with the changed file,
directory, or KLB is less than the value of N, and
the re-encryption process starts by generating a new
key for the changed file, directory, or KLB, and the
value of F for the new key is set to the current value
of N, and the changed file, directory, or KLB is
encrypted with said new key, and the changed and
encrypted file, directory, or KLB is stored in the
distributed data storage.

2. The method according to claim 1, wherein
said Key Lock Boxes are assigned to directories of a file
system, and
each KLB among said Key Lock Boxes stores keys for
each file or files of a directory.

3. A method for handling group sharing in a distributed
data storage environment, wherein specified files, directories
and Key Lock Boxes of a given user or a given device of
group member devices are stored in a manner that the
specified files can be retrieved from the distributed data
storage system, the method comprising:
storing a set of keys in said Key Lock Boxes, wherein
said Key Lock Boxes contains the set of keys to a
subset of files, directories or said Key Lock Boxes;
generating, by only the group member devices, a common
group key by using a key exchange protocol between
said group member devices;
assigning one specific Key Lock Box (KLB) among said
Key Lock Boxes as a Master Key Lock Box (MKLB),
wherein
the MKLB represents the root of an oriented tree graph,
each KLB among said Key Lock Boxes is a node in the
oriented tree graph,
each KLB, other than the MKLB, has a parent KLB that
is represented as the node in the tree graph that is one
step towards the direction of the root node;
encrypting said Key Lock Boxes with unique keys;
storing the unique keys of each file, directory, or KLB in
its parent KLB;
encrypting, by a group member device of said group
member devices, said MKLB with the generated common group key;
decrypting said MKLB by using the generated common
group key to obtain a first set of keys, wherein
the first set of keys in a first KLB among said Key Lock
Boxes includes at least a key unique to a second KLB
among said Key Lock Boxes which is a direct child
of the first KLB;
decrypting, downwards in the oriented tree graph, a KLB
among said Key Lock Boxes by using said unique key
of said first set of keys to obtain the second set of keys,
wherein the first set of keys are different than the
second set of keys;
decrypting, downwards in the oriented tree graph, until a
key of a requested file or directory is obtained; and
decrypting file or directory with said obtained key,
wherein
if the direct parent KLB of the file, directory, or KLB
is the MKLB, then the key of the file, directory, or
KLB is stored in the MKLB and MKLB is encrypted
with the actual group key and the re-encryption
process stops, and
if the direct parent KLB of the file, directory, or KLB
is not the MKLB, then the key of the file, directory,
or KLB is stored in the direct parent KLB, and the
re-encryption process is started for the direct parent
KLB.

4. The method according to claim 1, wherein
in response to a change of a group member device or a
group member user,
the re-encryption process is performed where a first new
set of keys for a first KLB is generated and the first
KLB is re-encrypted with a second new set of keys, and
the first new set of keys is stored in said first KLB, and
the re-encryption process is performed upwards in the
oriented tree graph until a root folder's KLB, the
MKLB, is re-encrypted.

5. A method for handling group sharing in a distributed
data storage environment, wherein specified files, directories
and Key Lock Boxes of a given user or a given device of
group member devices are stored in a manner that the
specified files can be retrieved from the distributed data
storage system, the method comprising:
storing a set of keys in said Key Lock Boxes, wherein
said Key Lock Boxes contains the set of keys to a
subset of files, directories or said Key Lock Boxes;
generating, by only the group member devices, a common
group key by using a key exchange protocol between
said group member devices;
assigning one specific Key Lock Box (KLB) among said
Key Lock Boxes as a Master Key Lock Box (MKLB),
wherein
the MKLB represents the root of an oriented tree graph,
each KLB among said Key Lock Boxes is a node in the
oriented tree graph,
each KLB, other than the MKLB, has a parent KLB that
is represented as the node in the tree graph that is one
step towards the direction of the root node;

encrypting said Key Lock Boxes with unique keys;
storing the unique keys of each file, directory, or KLB in its parent KLB;
encrypting, by a group member device of said group member devices, said MKLB with the generated common group key;
decrypting said MKLB by using the generated common group key to obtain a first set of keys, wherein
the first set of keys in a first KLB among said Key Lock Boxes includes at least a key unique to a second KLB among said Key Lock Boxes which is a direct child of the first KLB;
decrypting, downwards in the oriented tree graph, a KLB among said Key Lock Boxes by using said unique key of said first set of keys to obtain the second set of keys, wherein the first set of keys are different than the second set of keys;
decrypting, downwards in the oriented tree graph, until a key of a requested file or directory is obtained; and
decrypting file or directory with said obtained key, wherein
wherein
in response to indication that the common group key is necessary to be changed,
the re-encryption process is initiated where all keys are marked dirty,
dirty keys cannot be reused,
if an original file, directory or KLB changes and needs to be uploaded to the distributed data storage system and is encrypted with a dirty key, then a new replacement key is generated and the new replacement key is put into the parent KLB which is first uploaded to the distributed data storage system, and
the original file, directory or KLB is then uploaded with the newly generated replacement key, and wherein
a common group key version is represented by a value of N, N is a value greater or equal to 1 and the value of N starts with a value of 1,
each time the common group key version is changed, the value of N is increased by a value of 1,
each key has its own key version which is represented by a value of F,
each time a new key is generated and inserted in a KLB, the value of F for that particular key is set to the current value of N, and
a key is marked dirty when the F of a particular key is less than N.

6. The method according to claim 1, wherein
the key exchange protocol is implemented by a TGDH protocol supplemented with persistent operation using the distributed storage system as a broadcast channel.

7. The method according to claim 1, wherein
said distributed data storage system is a cloud storage environment.

8. The method according to claim 3, wherein
said Key Lock Boxes are assigned to directories of a file system, and
each KLB among said Key Lock Boxes stores keys for each file or files of a directory.

9. The method according to claim 5, wherein
said Key Lock Boxes are assigned to directories of a file system, and
each KLB among said Key Lock Boxes stores keys for each file or files of a directory.

10. The method according to claim 3, wherein
in response to a change of a group member device or a group member user,
the re-encryption process is performed where a first new set of keys for a first KLB is generated and the first KLB is re-encrypted with a second new set of keys, and the first new set of keys is stored in said first KLB, and
the re-encryption process is performed upwards in the oriented tree graph until a root folder's KLB, the MKLB, is re-encrypted.

11. The method according to claim 5, wherein
in response to a change of a group member device or a group member user,
the re-encryption process is performed where a first new set of keys for a first KLB is generated and the first KLB is re-encrypted with a second new set of keys, and the first new set of keys is stored in said first KLB, and
the re-encryption process is performed upwards in the oriented tree graph until a root folder's KLB, the MKLB, is re-encrypted.

12. The method according to claim 3, wherein
the key exchange protocol is implemented by a TGDH protocol supplemented with persistent operation using the distributed storage system as a broadcast channel.

13. The method according to claim 5, wherein
the key exchange protocol is implemented by a TGDH protocol supplemented with persistent operation using the distributed storage system as a broadcast channel.

14. The method according to claim 3, wherein
said distributed data storage system is a cloud storage environment.

15. The method according to claim 5, wherein
said distributed data storage system is a cloud storage environment.

* * * * *